SILAS R. DIVINE, OF NEW YORK, N. Y.

Letters Patent No. 91,313, dated June 15, 1869.

IMPROVED MODE OF TREATING THE SPENT OXIDE OF IRON USED FOR PURIFYING GAS.

The Schedule referred to in these Letters Patent and making part of the same.

*To all whom it may concern:*

Be it known that I, SILAS R. DIVINE, of the city, county, and State of New York, have invented a new and improved Mode of Volatilizing Sulphur from Hydrated Peroxide of Iron, which has been used for decomposing sulphide of hydrogen, recovering the sulphur, and revivifying the spent oxide of iron.

The nature of my invention consists in volatilizing the free sulphur contained in the spent oxide by means of superheated steam, and condensing the sulphur.

To enable others skilled in the art to use my invention, I will proceed to describe the mode of operation.

It is well known that hydrated peroxide of iron reacts with sulphide of hydrogen, producing sulphide of iron and water, and that the sulphide of iron, on exposure to air, passes back to the state of hydrated peroxide, while free sulphur is deposited within the mass.

This process is largely employed for the purification of coal-gas, and the iron oxide is used repeatedly, until the mass becomes so charged with free sulphur that it is no longer effective for the purpose of gas-purification.

To remove the sulphur, and revivify the refuse oxide, I place it in a closed iron vessel, having a perforated false bottom, and deliver steam, superheated to a temperature not greatly exceeding 500° Fahrenheit, through the mass, by letting it escape upward through the perforations of the false bottom. The sulphur will be rapidly volatilized, and may be collected by delivering the steam and volatilized sulphur through a pipe into a tank of water. The sulphur, having a melting-point above the boiling-point of water, will be arrested, and when the operation is finished, will subside to the bottom of the tank in the form of a fine powder.

Care must be taken not to heat the steam so highly as to dehydrate the peroxide of iron, for in that case its power to decompose sulphide of hydrogen would be destroyed.

What I claim as my invention, and desire to secure by Letters Patent, is—

1. Volatilization or sublimation of sulphur by means of superheated steam.

2. The revivification of hydrated peroxide of iron which has been used for the decomposition of sulphide of hydrogen, by means of superheated steam.

3. The recovery of the sulphur, by delivery into water, or by condensing the steam and sulphur by any of the known methods.

SILAS R. DIVINE.

Witnesses:
HENRY M. BREWSTER,
M. R. CONNOLLY.